United States Patent
Stöcker

(10) Patent No.: US 10,601,836 B2
(45) Date of Patent: Mar. 24, 2020

(54) OBSERVATION SYSTEM

(71) Applicant: Carsten Stöcker, Hilden (DE)

(72) Inventor: Carsten Stöcker, Hilden (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/240,487

(22) Filed: Jan. 4, 2019

(65) Prior Publication Data

US 2019/0141045 A1    May 9, 2019

Related U.S. Application Data

(63) Continuation of application No. PCT/EP2016/065849, filed on Jul. 5, 2016.

(51) Int. Cl.
| | |
|---|---|
| *H04L 29/06* | (2006.01) |
| *H04L 29/08* | (2006.01) |
| *G06F 16/182* | (2019.01) |
| *B64G 1/10* | (2006.01) |
| *H04B 7/185* | (2006.01) |
| *H04L 9/32* | (2006.01) |

(52) U.S. Cl.
CPC .......... *H04L 63/101* (2013.01); *B64G 1/1021* (2013.01); *G06F 16/1824* (2019.01); *G06F 16/1834* (2019.01); *H04B 7/18521* (2013.01); *H04L 9/3247* (2013.01); *H04L 63/10* (2013.01); *H04L 67/104* (2013.01); *H04L 67/12* (2013.01); *H04L 2209/38* (2013.01)

(58) Field of Classification Search
CPC ... H04L 63/10; H04L 63/108; H04L 63/0869; H04L 29/06823; H04L 29/06632; H04L 9/3273; G06F 16/1834

See application file for complete search history.

(56) References Cited

U.S. PATENT DOCUMENTS

| | | | |
|---|---|---|---|
| 2015/0022666 A1* | 1/2015 | Kay | H04L 67/025 348/159 |
| 2017/0243213 A1* | 8/2017 | Castinado | G06Q 20/401 |
| 2017/0279774 A1* | 9/2017 | Booz | G06F 16/24568 |

FOREIGN PATENT DOCUMENTS

WO    WO 2014/089807 A1    6/2014

OTHER PUBLICATIONS

Google, "Hyperledger Whitepaper," Feb. 17, 2016, 20 pages.

* cited by examiner

*Primary Examiner* — Tri M Tran

(74) *Attorney, Agent, or Firm* — Reinhart Boerner Van Deuren P.C.

(57) ABSTRACT

Embodiments of an observation system are disclosed herein. The observation system includes at least one observation device having at least one observation unit configured to observe at least one observation object in accordance with at least one first instruction data set. The observation system also includes at least one access control arrangement configured to control access to the observation device by at least one access entity. The access control arrangement includes at least one first peer-to-peer module assigned to the observation device and configured to forward at least one first instruction data set to the observation unit. Also included is at least one peer-to-peer application of at least one peer-to-peer network. The peer-to-peer application is configured to control the access to the observation device by allowing the access entity to cause the provision of at least one first instruction data set to the first peer-to-peer module.

13 Claims, 6 Drawing Sheets

OBSERVATION SYSTEM

CROSS-REFERENCE TO RELATED PATENT APPLICATION

This application is a continuation of PCT/EP2016/065849, filed Jul. 5, 2016, the entire teachings and disclosure of which are incorporated herein by reference thereto.

FIELD

The invention relates to an observation system comprising at least one observation device comprising at least one observation unit configured to observe at least one observation object in accordance with at least one first instruction data set and at least one access control arrangement configured to control access to the observation device by at least one access entity. Further the invention relates to a method for operating an observation system, an observation device and a peer-to-peer application of a peer-to-peer network.

BACKGROUND

Observation systems with one or more observation devices are used for different applications. Exemplified observation devices are space observation devices, earth observation devices, weather observation devices, environmental observation devices, traffic observation devices, security/surveillance devices, vehicle environment observation devices (e.g. camera and/or sensor in e.g. a car), and the like. An observation device usually comprises at least one observation unit, such as one or more sensor(s) and/or instrument(s). An observation unit is configured to observe at least one observation object e.g. by monitoring at least one parameter related to said observation object. The observation object may be the space, traffic, earth, weather, facilities, public space, living species, oceans, environment and the like.

The observation device is usually controlled by a central control device. In particular, the central control device can transmit a first instructions data set in order to control the observation device such that the observation unit measures at least one parameter in accordance with said instructions data set. In addition, as a result of the observation process the observation unit may be configured to provide at least one observation data set regarding the observation object comprising at least one or more measured parameter value(s) to the central control device.

An exemplified prior art observation system 100 is shown in FIG. 1. The observation system 100 comprises a central control device 102, such as a control room 102 or the like, and an observation device 104 in form of a satellite 104. The satellite 104 may be a weather satellite 104. In order to observe the observation object, i.e. the weather, the satellite 104 comprises an observation unit 106 configured to monitor at least one weather or meteorological parameter. For instance, the observation unit 106 can comprise one or more sensor(s) and/or instrument(s) for measuring one or more parameter(s) related to the observation object.

Based on the measured one or more parameter(s), the observation unit 106 provides at least one observation data set to the central control device 102. More particularly, the observation unit 106 can be connected with a communication unit 108 of the satellite 104. The communication unit 108 is configured to transmit at least the observation data set to a central server 114 of the central control entity 102 via a communication connection 112 and a communication unit 110 of the central control entity 102.

On the one hand, the central server 114 is configured to store the one or more observation data set(s), to analyze the one or more observation data set(s) and/or to provide access to one or more observation data set(s) or analysis result(s). For instance, the central server 114 may have evaluating means configured to evaluate one or more observation data set(s). The central server 114 is configured to allow access to the observation data set(s) and/or results. For instance, authorized client computers 116 can access said data under the control of the server 114.

On the other hand, the central server 114 is configured to control the observation device 104. For instance, the central server 114 can transmit an instructions data set to the satellite 104 in order to instruct the satellite 104 and/or observation unit 106 to monitor one or more specific parameters.

In addition, the observation system 100 comprises a plurality of client computers 116. The client computers 116 can communicate with the central server 114 via a further communication unit 118 of the central control entity 102 and a communication network 120.

However, a disadvantage of such observation systems is the server-client structure of these systems. Usually, the at least one central control device comprises one or more server(s). The observation device and/or the client computers are formed as clients. A disadvantage of server-client structures of this kind, particularly the server (or platform), apart from the high transaction costs, is that the central instance or central server manages confidential data, such as access data for controlling and operating the observation device, observation data sets, or user data. A persistent problem affecting the central instance is that of protecting the confidential data stored on one or more servers from access by unauthorized third parties. In particular, a high degree of security expenditure is required, in order to prevent said data from being tampered with. This in turn leads to higher transaction costs. A further disadvantage is the complex and costly infrastructure for providing the described server-client structure. Furthermore, it is not possible to control the observation device by a client computer in a simple and secure manner.

Therefore, the object of the present invention is to provide an observation system with at least one observation device, wherein a remote access to the observation device is enabled in a secure and, at the same time, simple manner.

BRIEF SUMMARY

The above object is solved according to a first aspect of the invention by an observation system as described herein. The observation system comprises at least one observation device comprising at least one observation unit configured to observe at least one observation object in accordance with at least one first instruction data set. The observation system comprises at least one access control arrangement configured to control access to the observation device by at least one access entity. The control arrangement comprises at least one first peer-to-peer module assigned to the observation device. The first peer-to-peer module is configured to forward at least one first instruction data set to the observation unit. The control arrangement comprises at least one peer-to-peer application of at least one peer-to-peer network. The peer-to-peer application is configured to control the access to the observation unit by allowing an access entity to cause the provision of at least one instruction data set to the first peer-to-peer module, in particular, by a second peer-to-peer module of the access entity.

In contrast to prior art observation systems, according to the present invention, a secure access to at least one observation device can be provided by a peer-to-peer application of a peer-to-peer network configured to control the access to the observation device. In other words, an observation system can be managed and controlled without a central instance but by a peer-to-peer application of a peer-to-peer network. Thereby, a first peer-to-peer module assigned to the observation device is capable of at least receiving a first instruction data set from the peer-to-peer application and peer-to-peer network, respectively. By the fact that instead of a central server or a platform, a peer-to-peer network (also called a framework) undertakes the in particular tamper-proof controlling of the observation system, in particular, the control of an access to an observation device of the observation system, by means of a peer-to-peer application, high security standards are achieved in that all computers (peer nodes or simply nodes) in the peer-to-peer network, at least a part of the peer computers in the peer-to-peer network, monitor(s) at least the access to the observation device by an access entity. The transaction costs can be significantly reduced. No central, superior platform, server, cloud, etc. is required. The complexity of managing and controlling an observation system can be significantly reduced. An access entity can request for a temporarily access to an observation device.

The observation system comprises one or more (different) observation device(s). An observation device is configured to observe at least one observation object by means of at least one observation unit. Exemplified observation objects are the space, weather, traffic, earth, and the like. The observation unit may comprise one or more sensor(s) and/or instrument(s) in order to observe the at least one observation object. For instance, at least one parameter related to the observation object can be measured by at least one sensor and/or instrument.

In addition, according to an embodiment, the at least one observation unit may comprise one or more actors(s) and/or instrument(s). An actor may be configured to control the observation process. For instance, an actor may be configured to move one or more sensor(s) and/or instrument(s) (e.g. moving a camera lens).

Furthermore, the observation system comprises at least one access control arrangement configured to control access to the observation device by at least one access entity. In other words, the access control arrangement manages and controls the access of an access entity to at least one observation device. The present access control arrangement may comprise one or more (separate) element(s).

The observation system, in particular, the access control arrangement comprises at least one first peer-to-peer module. The first peer-to-peer module is assigned to the at least one observation device. Preferably, each first peer-to-peer module is uniquely assigned to a respective observation device. For instance, each observation device can comprise a first peer-to-peer module. Preferably, the peer-to peer module is integrated in the observation device.

It is also possible that a communication connection is provided between the observation device and the first peer-to-peer module assigned to said observation device. This means that the first peer-to-peer module can at least communicate and/or act on behalf of the observation device. For example, the first peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one observation device may have a secure communication channel to the processing device (or mobile communication device) of the data center and the processing device itself may have a connection to the peer-to-peer network. In an embodiment the remote processing device may be a gateway to the peer-to-peer network. This means that the observation device can securely communicate via its first peer-to-peer module and the gateway to the peer-to-peer network.

In comparison to a client server observation system in which a server provides a service and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the peer-to-peer application. In particular, the first peer-to-peer module is configured to communicate, e.g. send messages to the peer-to-peer application and/or read data stored in the peer-to-peer application. The first peer-to-peer module may be a peer and node, respectively, of the peer-to-peer network.

The first peer-to-peer module is, in particular, configured to communicate with the peer-to-peer application of the peer-to-peer network. By communicating with the peer-to-peer application the first peer-to-peer module and the respective observation device may be controllable by the peer-to-peer application. In particular, the access to the at least one observation device for operating the at least one observation device is controllable by the peer-to-peer application. For instance, the peer-to-peer application may comprise at least one access controlling means. The access controlling means may be preferably formed by an access control smart contract comprising computer code which can be capable of controlling the access to the at least one observation device.

More particularly, the peer-to-peer application is configured to allow at least one access entity to access the at least one observation device such that the access entity can control the operation of the observation device. In other words, the peer-to-peer application is configured to decide whether an access entity is authorized to access an observation device or not. An access entity is an entity (e.g. any kind of processing device) which desires to access the observation device in order to operate the observation device in a desired way. Controlling the observation device includes, in particular, the controlling of the at least one observation unit. The observation device can be controlled/operated such that one or more desired parameter(s) related to the observation object are measured and, in particular, that the measurement result(s) are provided to the access entity.

In particular, by means of a second peer-to-peer module, the access entity can cause the provision of at least one first instructions data set to the at least one observation unit. For instance, the access entity can provide the first instructions data set to the peer-to-peer application or the access entity can provide instructions information to the peer-to-peer application. In the latter case the peer-to-peer application may comprise converting means configured to convert the instructions information into a first instructions data set. In any case, the provision of the first instructions data set may be initiated by the access entity but is under the control of the peer-to-peer application.

It shall be understood that the operation of an observation device may be restricted to preset available function(s) by predefining one or more operation rule(s). For instance, the provider entity of the at least one observation device may define said rule(s).

The list of all (anonymised or pseudoanonymised) participants or entities of the at least one peer-to-peer network can preferably be made known to each participant, so in particular to each entity of the observation system, as a peer-to-peer identifier, e.g. in the form of a communications address. A mixer logic (i.e. mixing of identifications and using random identifications for a specific observation device or user for its individual transactions) can be used to disguise user identifications of individual transactions to avoid analysis of movement profiles.

A peer-to-peer module can be at least partially formed by a software module and/or at least partially formed by a hardware module.

Furthermore, an observation system may comprise one or more actor(s) which can be triggered to execute a control message e.g. to steer action(s) in or around the observed object(s). For instance, by a peer-to-peer module, control message(s) can be send to the at least one actor (e.g. open and/or closing of a gate for granting access for a vehicle or a person). A response of the actor to a control signal may be observed by the observation device(s). Execution of a control message may be observed and/or measured and a feedback loop may control a correct execution of the control message.

According to a first embodiment of the observation system of the present application, the peer-to-peer application may be configured to generate at least one observation access transaction agreement about an access action to the observation device through the access entity. The peer-to-peer application may be configured to store the generated observation access transaction agreement. The access action is in particular an access process during which an access entity can access and operate an observation device by allowing the access entity to transmit instructions information (e.g. first instructions data set) to the observation device.

The generation of the observation access transaction agreement can be caused or initiated by at least one peer-to-peer module, such as the second peer-to-peer module assigned to the access entity, for example by transmitting a request message comprising at least one instruction on the generation of the observation access transaction agreement. The request message may be sent by the access entity in order to temporarily access the observation device.

In particular, a suitable code and, where necessary, at least one key (e.g. signature) for verifying the sender of a message (e.g. sending access entity) and/or the authenticity of a message can be transmitted to the peer-to-peer application or written in the peer-to-peer application by a peer-to-peer module. The observation access transaction agreement may be generated between two entities, such as the access entity and the provider entity of the observation device and/or observation unit. Preferably following a confirmation message from the provider entity comprising a suitable instruction and, where necessary, at least one key (e.g. signature) for verifying the sender of the confirmation message, a corresponding observation access transaction agreement can be advantageously generated following a check by the peer-to-peer network of the peer-to-peer application. Expressed in simple terms, each entity can search for one or a plurality of suitable partners by means of the peer-to-peer network or the peer-to-peer application and an observation access transaction agreement can be generated by means of the peer-to-peer application.

According to a preferred embodiment, the generated observation access transaction agreement may comprise at least one of:
- observation access criterion,
- access duration condition, in particular, an access start condition and/or an access end condition,
- access identifier assigned to the access entity,
- at least one released function of the observation unit,
- observation unit data evaluation algorithm(s),
- observation unit data analytics parameter(s) and/or algorithm(s),
- identifier assigned to an observation unit actor,
- control parameter(s) and/or rule(s) for the observation unit actor,
- access data for a (decentral) data storage, and
- identifier assigned to the observation device to be accessed.

The observation access transaction agreement may comprise (technical) detail(s) about the access of an access entity to the observation device and/or observation unit. Preferably, at least one access identifier assigned to the access entity can be stored in the observation access transaction agreement. The access identifier may be a unique (peer-to-peer) identifier assigned to the access entity, i.e. the entity which wants to access the observation device. For instance, the identifier may be a serial number, a communications address, a unique code, signature, name or other identifier of a user of the access entity, or the like. Furthermore, an (unique) identifier assigned to the observation device to be accessed can be stored in the agreement. Also this (peer-to-peer) identifier may be serial number, a communications address, a unique code, signature or the like. By storing these details, the peer-to-peer application can control the access of a specified access entity to the at least one specified observation device.

Alternatively or preferably additionally, at least one access duration condition may be stored in the observation access transaction agreement. An access duration condition may define the usage duration or access duration of the observation device/unit by an access entity. For instance, a specific (fixed or flexible) time duration can be stored as an access duration condition. Thereby, a start time and an end time may be stored as access start condition and access end condition, respectively. It may be also possible that alternatively or additionally the fulfillment of a particular task, such as the measuring of a particular number of measuring samples by the observation unit, or the like, can be used as an access duration condition. Thereby, the fulfillment of a task may be an access end condition of a first access action/process and at the same time an access start condition of a subsequent access action/process.

Further, an observation device may provide one or more function(s) by the at least one observation unit. For instance, a first function, such as measuring of a first parameter, may be provided by a first sensor and/or instrument of the observation unit and at least one further function, such as measuring of at least one further parameter may be provided by a further sensor and/or instrument of the observation unit. It may be possible that the access may be only released to one or a part of the generally available function(s) and/or for a portion of the total access duration condition for a specific access entity. This may be also stored in the observation access transaction agreement, for instance, by storing sub-identifiers of the released function(s) and sensor(s) and/or instrument(s), respectively. For example, the observation access transaction agreement may comprise one or more detail(s) about the allowed operation functions of the observation unit, such as one or more released function(s) and/or one or more locked function(s).

Furthermore, it may be possible that at the same time a part of the functions of the observation unit is released for a first access entity and at least one further part of the functions of the observation unit is released for at least one further access entity.

Alternatively or preferably additionally, at least one observation access criterion may be stored in the observation access transaction agreement. The observation access criterion may be a financial value to be transferred from an account of access entity to an account of the provider entity for accessing the observation device.

Furthermore, in the case one or more observation data set(s) should be evaluated and/or analyzed, one or more observation unit data evaluation algorithm(s) and/or one or more observation unit data analytics parameter(s) and/or algorithm(s) can be stored in the observation access transaction agreement. In addition or alternatively, evaluation tool(s) and/or analysis tool(s) can be identified in the observation access transaction agreement.

One or more identifier(s) of actor(s) e.g. configured to move one or more sensor(s) during an observation access process can be stored in the observation access transaction agreement. In addition, control parameter(s) and/or control rule(s) can be stored. Based on such parameters and/or rules one or more actor(s) can e.g. move a sensor or the like.

Access data for a (decentral) data storage can be optionally stored in the observation access transaction agreement. For instance, the data can be used to access data stored in said storage and/or to store e.g. observation data set(s) into said storage.

In order to temporarily access and operate an observation device, the access entity may transmit by means of the second peer-to-peer module a request message to the peer-to-peer application comprising at least one of (desired) observation access criterion, (desired) access duration condition, in particular, an (desired) access start condition and/or an (desired) access end condition, access identifier assigned to said access entity, at least one (desired) released function of the observation unit, and identifier assigned to the (desired) observation device to be accessed.

Further, in order to allow an access to an observation device only to authorized access entities, according to an embodiment of the observation system, at least a part of the nodes of the peer-to-peer network may be configured to control access to the observation device by conducting at least one access authorization evaluation process, in particular, prior to allowing the access entity to access to the observation device. The conduction of an access authorization evaluation process, e.g. a validation process, may include the checking of an access criterion. For instance, an identifier of the access entity (trying to access the at least one observation device) may be checked e.g. by comparing the identifier with stored identifiers of authorized access entities. For instance, the identifiers may be stored in the peer-to-peer application and/or a database controlled by the peer-to-peer application. Preferably, two or more nodes of the peer-to-peer network, in particular, (almost) all nodes of the peer-to-peer network may conduct the at least one access authorization evaluation process, e.g. may validate the identifier of the access entity. Only in the case the access authorization evaluation is positive, e.g. a match of the identifier with a stored identifier can be made (by all nodes conducting the at least one access authorization evaluation process), the access to the observation unit can be granted. Otherwise, an access can be denied.

In a particular preferred embodiment, at least a part of the nodes of the peer-to-peer network may be configured to conduct the access authorization evaluation process by evaluating at least an access identifier of an accessing entity and the at least one access identifier of the at least one stored observation access transaction agreement, preferably, stored in the peer-to-peer application. In particular, the received identifier of an access entity trying to access at least one observation device can be compared with the stored identifier(s) of one or more observation access transaction agreement(s). Only if a match can be identified, an access can be granted. By way of example, in order to access an observation device the access entity may transmit an access message comprising e.g. instruction information and at least one identifier. The identifier may be formed by a signature or the message can additionally comprise a signature. The message may be hashed, time stamped and/or encrypted. A high security can be provided.

It shall be understood that the previously described check of the identifier of the access entity by conducting a comparison with one or more stored identifier(s) of (generally) authorized access entities can be additionally performed, e.g. prior to generating the observation access transaction agreement. In other words, at least two access authorization evaluation processes can be conducted. For instance, the generation of an observation access transaction agreement can only be conducted if the identifier of the access entity corresponds to a stored identifier of generally authorized access entities.

Furthermore, according to a further embodiment, alternatively or preferably additionally to the previously described conduction of at least one access authorization evaluation process, the peer-to-peer application may be configured to release an access to the observation device depending on at least one access duration condition of the stored observation access transaction agreement, preferably, stored in the peer-to-peer application. Alternatively or additionally, the peer-to-peer application may be configured to lock an access to the observation device depending on at least one access duration condition of the stored observation access transaction agreement, preferably, stored in the peer-to-peer application. The access to the at least one observation unit can be accurately conducted. For instance, only if the result of the previous described access authorization evaluation process is positive and if the access duration condition is fulfilled, e.g. the access of the access entity occurs during the stored access duration time, the access to the observation device is actually granted.

According to a further embodiment, for the at least one observation device, preferably, for each observation device, the peer-to-peer application may manage an (respective) access schedule based on the one or more generated observation access transaction agreement(s). The access schedule may be also stored in the peer-to-peer application. The generation of a new observation access transaction agreement may depend on the stored access schedule. The managing of the access to an observation device by means of a peer-to-peer application can be further facilitated.

Preferably, the observation device is at least one of the group comprising space observation device, earth observation device, weather observation device, environmental observation device, traffic observation device, security/surveillance device, vehicle environment observation device (e.g. camera and/or sensor of a vehicle, like a car). It shall be understood that an observation system may comprise two or more (different) observation devices from e.g. two or more different provider entities. For instance, an observation device may be an immobile device, such as an immobile weather station, an immobile telescope station, immobile traffic monitoring station or the like. Alternatively, the observation device may be a mobile device, such as a satellite, (weather) balloon, observation aircraft, observation drone, water and/or land observation vehicle including autonomous vehicles, camera, and the like.

According to one embodiment, the at least one observation device is a mobile observation device. The at least one observation unit of the mobile observation device may include one or more observation element(s), e.g. one or more sensor(s) and/or instrument(s), and at least one drive controlling element. The drive controlling element may be configured to cause a movement of the mobile observation device in accordance with at least one movement instruction (e.g. speed instruction(s), destination instruction(s), such as geographic coordinate(s), height instruction(s), etc.) included e.g. in the provided first instructions data set.

The at least one sensor and/or instrument may be configured to measure at least one specific parameter related to the observing object.

According to another embodiment, an observation device can include a processing unit for in-device analytics. For instance, parameter(s) and/or code can be deployed in an observation device and/or the peer-to-peer application to detect specific and predefined object(s) and/or action(s) (e.g. face recognition tool, foreign object detection tool, building intrusion detection tool). Deployment of code and/or data can be conducted in a tamper-proof way by preferably using trusted execution environments (such as Intel SGX). In case a specific object and/or action is detected via analysis of an observation data set the observation device can trigger an action that may be stored in the peer-to-peer application. For instance, said stored action can be used for audit purposes and via registered asset(s) in the peer-to-peer application a secure communication among devices—e.g. by using signed messages—can be achieved. An alert can be sent out and/or an actor, such as a door lock, can be triggered by the peer-to-peer application.

In a further embodiment one or more analytic algorithm(s) may be deployed that enable decentral machine learning or artificial intelligence among two or more observation devices.

Furthermore, according to a further preferred embodiment, the observation unit may be configured to create at least one observation data set based on at least one measured parameter related to the observation object. An observation data set can comprise one or more measurement value(s) of one or more measured parameter(s). It shall be understood that two or more observation data sets can be created. The observation data set can preferably comprise further parameter(s), such as a time stamp, at least one location parameter (e.g. geographic coordinates of the measured parameter), further boundary conditions of the measurement, identifier of the observation unit, signature of the observation unit, etc.

By registering an observation device or one or more module(s)/unit(s) of an observation device a proof of authenticity can be achieved. In a preferred embodiment during or at the start of a manufacturing process of an observation device said observation device is provided with a unique identifier and is (directly) registered with said identifier in the peer-to-peer application (e.g. as described below). Preferably, the observation device may comprise a trusted platform module or is built upon a trusted computing platform or the like which can generate, for instance, a public and private key pair. The public key pair may be registered in the peer-to-peer application. The observation device can then sign message(s) for a proof and/or ownership and/or authenticity with its private key. Data sets created by the observation device may be hashed, time-stamped, signed and/or encrypted.

Further, during the manufacturing process of the observation device, device specification(s), production parameter(s), test parameter(s) and validation parameter(s) may be stored in a digital product memory stored in the peer-to-peer application. A user (or a machine or an algorithm) may get access to the data sets generated by the observation device in order to assess the quality of the data sets by checking technical parameters in the digital product memory. Thereby, the authenticity and/or ownership and/or intellectual property rights of the data can be checked.

According to a further embodiment, the observation system may comprise a (signal) generation device comprising a signal unit configured to send at least one signal receivable by the observation device. The signal unit may be configured to sign the sent signal with a (private) key. The observation unit of the observation device may be configured to receive at least one signal sent by the generation device. The observation unit may be configured to (only) further process the received signal if said signal comprises a valid key. For instance, processing includes the evaluation and/or forwarding of the signal or information included in the signal.

In particular, according to an embodiment, the at least one signal generation device can be registered on the peer-to-peer application. Preferably, the generation device can be generated as described below in connection with an observation device and/or access entity. The at least one signal of the signal generation device may be observed by an observation device. An example for such an observation system is a satellite based positioning system. In this case the at least one signal generation device is, for instance, a GPS (Global Positioning System), Galileo, Beidou and/or Glonas satellite and/or a ground based signal generation device, such as a differential GPS generation device. One or more of such space or ground based generation device(s) may send one or more (positioning) signals for calculating local positioning data received by at least one observation device (e.g. the observation unit may comprise a GPS receiver). Each signal unit can provide a sent signal with a key, e.g. by signing the signal. A list of authentic keys e.g. in form of identifiers, public key and/or signatures may be stored in the peer-to-peer application (as a result of positive registration processes). The list of ID listing of authentic or verified generation devices may be signed by the operator of the positioning system. The at least one observation device can verify the authenticity of the signal(s) generated by the generation device by verifying the signature using the identifiers and/or public keys registered in the peer-to-peer application.

The observation device may only accept signal(s) from generation devices that are in the list of generation devices signed by the system operator and/or signals that have a valid signature. In a further embodiment a reputation system for signal generation devices may be used to qualify signals from operators or individual devices. With the process described spoofing of generation devices can be prevented.

The at least one created observation data set can be provided from the observation unit to the first peer-to-peer module. The first peer-to-peer module may be configured to provide the at least one observation data set at least to a second peer-to-peer module of the access entity by means of the peer-to-peer application. For instance, the first peer-to-peer module can write the at least one observation data set into the peer-to-peer application e.g. by transmitting one or more messages including data of the observation data set and in particular, an identifier of the related access entity. The at least one observation data set can be stored in the peer-to-peer application. The at least one stored observation data set may be at least readable by the second peer-to-peer module. Additionally or alternatively, the peer-to-peer application, such as the access controlling means, may cause the transmission of the at least one observation data set to the second peer-to-peer module of the access entity.

Furthermore, according to an embodiment, the at least one observation data set can be forwarded by the peer-to-peer application to an evaluating means, e.g. an off-chain evaluating means, configured to evaluate at least one or more observation data set(s) according to predefined rule(s). The evaluation result can be forwarded to the access entity by the peer-to-peer application instead of the observation data set(s) or in addition to said observation data set(s). For instance, the at least one evaluating means may be stored in peer-to-peer application and/or provided by an off-chain computing entity controlled by the peer-to-peer application.

In a further preferred embodiment, the access entity can be configured to control at least one further entity depending on the provided observation data set. For instance, the access entity may be configured to control at least one electrical consumer and/or at least one electrical producer, such as a power plant, depending on the provided observation data set, such as weather data. Further, a grid operation system can be at least partly integrated in the observation system. A grid operation signal can be provided to the access entity. The access entity may be configured to control at least one electrical consumer and/or at least one electrical producer, such as a power plant, depending on the at least one provided observation data set and the grid operation signal. The grid operation signal can be provided by a central system which is connected to the peer-to-peer application or by decentral grid operations system that is built upon decentral analytics and/or optimization algorithm(s) provided by the peer-to-peer application.

Preferably, an evaluation result of the observation data set(s) can be used for controlling the further entity. For instance, weather forecast data can be at least partly derived from the provided observation data set. The delivery of electrical power can be controlled depending of the observation data set. Another example may be that a traffic flow can be controlled depending on a provided traffic observation data set or a traffic flow forecast based on at least one traffic observation data set.

In a further embodiment, a (mobile) observation device, such as a vehicle with a camera, can be configured to identify specific and in particular, predefined, objects (such as an individual person, specific type(s) of vehicles, specific traffic condition(s), such as a free parking space(s), weather pattern(s), etc.). For instance, based on the observation data set(s) and predefined rules/parameter(s), as identification information can be generated by the (mobile) observation device which can be stored in the peer-to-peer application. For instance, the identified object(s) stored in the peer-to-peer application may be used to inform at least one further participant of the system (e.g. law enforcement units, traffic statistics or control system, weather information or alert system, autonomous driving system and/or a free parking space information system). It shall be understood that a similar framework can be applied for stationary observation devices.

In a further embodiment, the at least one observation system may be an emergency alert system comprising one or more observation device(s). In particular, one or more observation device(s) can be configured to identify an emergency event (e.g. using camera systems, vehicle accident sensors, smoke detectors). An emergency event identified by the observation device can initiate the transmission of an alert to one or more emergency element(s) e.g. via the peer-to-peer application. Emergency conditions, message formats and/or emergency element contact details can be stored in the peer-to-peer application. The observation device may provide metadata about the emergency event and/or analytics about the emergency event (device ID, IDs of persons involved in an accident, signature, time stamp, credibility/quality of the data, position, type of emergency, impact, casualties, terrorist attack, people with weapons, etc.). The peer-to-peer application may be configured to aggregate emergency messages across multiple devices to provide an impact assessment to emergency elements (such as police stations or fire station or sirens or the like).

Furthermore, the peer-to-peer application may be configured to get emergency access to further data such as vehicle or user data (e.g. personal health records to inform emergency elements about a user's medical conditions or personal attribute such as blood group before or when arriving at an accident site). This access to these data should be preconfigured by individual vehicles or users. It shall be understood that an emergency event can be a security incident, a natural disaster or a terroristic attack.

Preferably, the observation system provides a remote control access arrangement. The at least one observation device and the access entity are arranged at a distance to each other.

Furthermore, according to a further embodiment, the peer-to-peer application may comprise at least one registration means configured to receive a registering message of a first peer-to-peer module assigned to the observation device and/or to receive a registering message of a second peer-to-peer module assigned to the access entity. The registration means may be configured to register the observation device by storing a unique (peer-to-peer) identifier of the observation device and/or to register the access entity by storing a unique (peer-to-peer) identifier of the access entity. For instance, in order to access an observation device by an access entity the observation device and the access entity must be registered in the peer-to-peer application.

An entity, device, unit or the like can be registered in the peer-to-peer application, as e.g. a so called smart asset. Each registered entity and device can be stored with its unique (peer-to-peer identifier) e.g. in one or more identifier list(s) of authorized access entities and/or observation devices. According to an embodiment of the observation system according to the present invention, at least one of the first and second peer-to-peer module may be configured to cause a registration of the entity and device, respectively, (or the corresponding peer-to-peer module) in the peer-to-peer application (or network) by transmitting a registering message comprising at least an identifier assigned to the entity (device) and/or peer-to-peer module. The identifier might be already a peer-to-peer identifier or another identifier suitable to uniquely identify the entity. The (unique peer-to-peer) identifier may be a serial number or a smart asset hash of e.g. the entity, the user's name of the entity, a communication address of an observation device, a signature, etc. If e.g. the identifier is not already a unique peer-to-peer identifier, e.g. if the identifier is a name of a network device, the peer-to-peer application, in particular, the registering means, may be configured to generate a unique peer-to-peer identifier for the respective entity (according to preset rule(s)). In particular, the registering means of the peer-to-peer application may register the respective entities by storing at least the peer-to-peer identification in the peer-to-peer application and/or a database controlled by the peer-to-peer application.

An entity, device, unit or the like can be a trusted platform module.

It shall be understood that an entity can be a user registered in the peer-to-peer application. Each registered user can be stored with or linked to its unique (peer-to-peer identifier) e.g. in one or more identifier list(s) of authorized access entities and/or observation devices. According to an embodiment of the observation system according to the present invention, a user may authenticate himself at one of the devices in an observation system.

Prior to the registration of an access entity, provider entity, observation device or the like, at least part of the nodes (peers) of the peer-to-peer network may check whether the registering requirements (such as specific entity specifications or valid signatures or compliance requirements) predefined by the peer-to-peer network are met by the entity/device requesting registration. For instance, it may be necessary that an observation device meets predefined technical specifications. In order to perform the check, preferably, further data may be included in the registering message. In particular, the peers of the peer-to-peer network may provide registering rules or registering requirements which must be fulfilled by an entity, observation device or the like to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor.

As previously described, it may be possible that in return to an access to an observation device, the access entity has to fulfill at least one generated observation access criterion prior to the access process/action, during the access process/action and/or after the access process/action. According to one embodiment, the peer-to-peer application may be configured to cause the conduction of an observation access criterion transaction based on at least one observation access criterion of the stored observation access transaction agreement, preferably, stored in the peer-to-peer application. For instance, the observation access criterion may be a financial value. Financial values can be (instantaneously) exchanged with a transaction via a cryptocurrency. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. According to the present invention, a man-in-the-middle is not necessary. Fully automated processes from authentication to charging and billing can be provided.

According to a further preferred embodiment, the at least one peer-to-peer application can be a decentralized register or a shared database configured to store data, e.g. observation access agreement(s), identifier(s), instructions data set(s), observation data set(s), with given certain proofs or signatures. In addition to e.g. identifiers, the decentral register can store computer code acting as e.g. access controlling means for controlling access to at least one observation device. In particular, the code can be invoked by a transaction to the address of the code in so called 'smart contracts'. This code can be processed on the node(s) of the decentral register.

In a further embodiment the computer codes of a device may include algorithm(s) for de-central cognitive analytics or machine learning. Analytics and learning can be shared with other devices can be shared, aggregated and further analyzed via the peer-to-peer applications.

A decentralized register can be readable at least by a part of the participants of the peer-to-peer network. In particular, every computer node, observation device and/or entity e.g. including at least one respective peer-to-peer module can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract may start the execution of a code of the smart contract while using data stored in the smart contract. For instance, sending observation data set to a controlling means may start the execution of the code resulting in e.g. forwarding the data to a second peer-to-peer module of the access entity.

The peer-to-peer application can be built upon the following elements: peer-to-peer network comprising Consensus System/Protocol, Data Structure, Merkle Trees, Public Key Signatures, Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer in the peer-to-peer network can be configured to review new information, in particular, based on older information stored in the peer-to-peer application. In addition, the at least one access controlling means may be monitored by at least a part of the nodes of the peer-to-peer network, preferably by all nodes. A manipulation of an access controlling means can thus be prevented, at least detected.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least by a part of the computers. For instance, after the generation of an observation access transaction agreement and/or after a successful registration, the agreement and identifier, respectively, can be stored at least by a part, preferably all nodes of the peer-to-peer network. The tamper resistance of the data stored in the peer-to-peer application can thereby be further improved. An access process or observation criterion transaction can be securely controlled.

In order to store new information in a tamper-proof way, the peer-to-peer application can comprise encryption means and/or signature means and/or verification means, wherein at least one of the encryption means and/or signature means and/or verification means is configured to store data, such as an observation access agreement(s), identifier(s), instructions data set(s), evaluation result(s), etc. In particular, it can be provided that by the hash function a link is established with at least one previously stored information in the decentral register. Further data, such as request messages, ordinary, contextual and/or transaction data of an entity, such as a network device, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the correctness of a received or provided data and of conducted processes, such as an access process, can be checked without the need of a central server. E.g. an access controlling means can be easily implemented as a smart contract in a block chain. An observation system can be managed in an easy manner.

In addition, the block chain can be used to generate predefined action(s) caused by at least one peer-to-peer module and/or an access controlling means in a tamper-proof manner. The block chain according to the present embodiment is particularly a decentralized, peer-to-peer-based register in which all data related to at least one access control process can be logged. A block chain is particularly suitable as a technical means to replace a central entity/server in a simple and secure manner.

In alternative embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different block chain client(s).

Data of the peer-to-peer application can be stored on the "decentral ledger technology" and/or the decentral ledger steers (encrypted) data storage accessible via the internet and preferably in de-central data storage, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

In addition, data feeds can be provided by the peer-to-peer application (so called "smart oracles"). Data feeds can provide further data relating to an observation object from at least one further source. For instance, further weather data can be provided by a meteorological provider. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of an observation device, the second peer-to-peer module of an access entity, etc. A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. conducting an access authorization evaluation, and one or more observing (or monitoring) nodes. An observing node can validate transactions to establish a trust level but does not validate all transactions which is done by the validating peer.

In an alternative embodiment, the peer-to-peer module is one of the computer nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as instructions information, observation data sets, to the peer-to-peer application via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

To securely deploy code and or data into a device a trusted execution environment such as Intel SGX or TPM or Direct Anonymous Attestation module can be integrated with a peer-to-peer module.

Similarly, in an alternative (not shown) embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

A further aspect of the present invention is a method for operating an observation system, in particular, a previously described observation system. The observation system comprises at least one observation device comprising at least one observation unit configured to observe at least one observation object in accordance with at least one first instruction data set, and at least one access control arrangement configured to control access to the observation device by at least one access entity, wherein the access control arrangement comprises at least one first peer-to-peer module assigned to the observation device and configured to forward at least one first instruction data set to the observation unit, and at least one peer-to-peer application of at least one peer-to-peer network, the method comprising:

controlling the access by allowing the access entity to cause the provision of at least one first instruction data set to the first peer-to-peer module.

The method can be in particular used for managing a remote access from an access entity to an observation device by a peer-to-peer network and peer-to-peer application, respectively. The grant of an access can preferably depend on the result of an access authorization evaluation process conducted by at least a part of the nodes of the peer-to-peer network. For instance, the method can further comprise:

conducting at least one access authorization evaluation process by at least a part of the nodes of the peer-to-peer network, and allowing an access to the observation device only upon a positive result of the access authorization evaluation process, like a positive validation of an identifier of the access entity or the like.

The at least one access authorization evaluation process can be conducted as previously described.

A further aspect is an observation device of an observation system, in particular, of a previously described observation system. The observation device comprises at least one observation unit configured to observe (and e.g. analyze) at least one observation object in accordance with at least one first instruction data set. The observation device comprises at least one first peer-to-peer module assigned to the observation device and configured to forward at least one first instruction data set to the observation unit. The observation device is accessible by at least one second peer-to-peer module of an access entity. The access to the observation device is controlled by the peer-to-peer application by allowing the access entity to cause the provision of at least one first instruction data set to the first peer-to-peer module, in particular, by means of the second peer-to-peer module.

It is noted that an access entity can, for instance, be a gate which opens in case special condition(s) are achieved (e.g. a vehicle approaching the gate is identified by either sending a (signed) ID via wireless communication or by a number plate or face recognition algorithm). Instructions for special conditions may be stored in the peer-to-peer application.

A further aspect of the present invention is a generation device of an observation system comprising at least one signal unit configured to send at least one signal receivable by at least one observation device, in particular, a previously described observation device, at least one peer-to-peer module assigned to the generation device and configured to forward at least one signal instruction data set to the signal unit, wherein the generation device is accessible by at least one second peer-to-peer module of an access entity, wherein the access to the generation device is controlled by the peer-to-peer application by allowing the access entity to cause the provision of at least one signal instruction data set to the peer-to-peer module.

The at least one signal unit may be configured to generate and send a continuous and/or a triggered signal that can be received be an observation device e.g. via the observation unit. At least one peer-to-peer module may be assigned to the generation device. The peer-to-peer module may be configured to generate and/or store a public/private key pair and, in particular, to sign signal(s) with the private key. Alternatively or additionally, at least one public/private key creation module and/or a trusted computing platform assigned to the generation device may be provided. Such a module may be configured to generate and/or store a public/private key pair and to sign signals with said private key. The generation device may be accessible by at least one second peer-to-peer module in order to trigger a signal (e.g. by transmitting a respective signal instruction data set to the signal unit). Additionally, the generation device may be accessible in order to send a configuration data set and/or to start a process to create a new public/private key pair and/or to start an update of cryptographic algorithms. The access to the generation device can be controlled by the peer-to-peer application by allowing the observation system to cause the provision of a list of authenticated generation devices and to allow observation devices to validate authenticity of signals sent by these generation devices.

A still further aspect is a peer-to-peer application of a peer-to-peer network, in particular, a previously described peer-to-peer application. The peer-to-peer application comprises at least one access controlling means configured to control an access to at least one observation device by at least one access entity. The access controlling means are configured to control the access by allowing the access entity to cause the provision of at least one first instruction data set to the first peer-to-peer module.

The access controlling means may be in particular formed as a smart contract of the peer-to-peer application, such as a block chain.

The features of the methods, systems, modules, peer-to-peer applications, observation devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
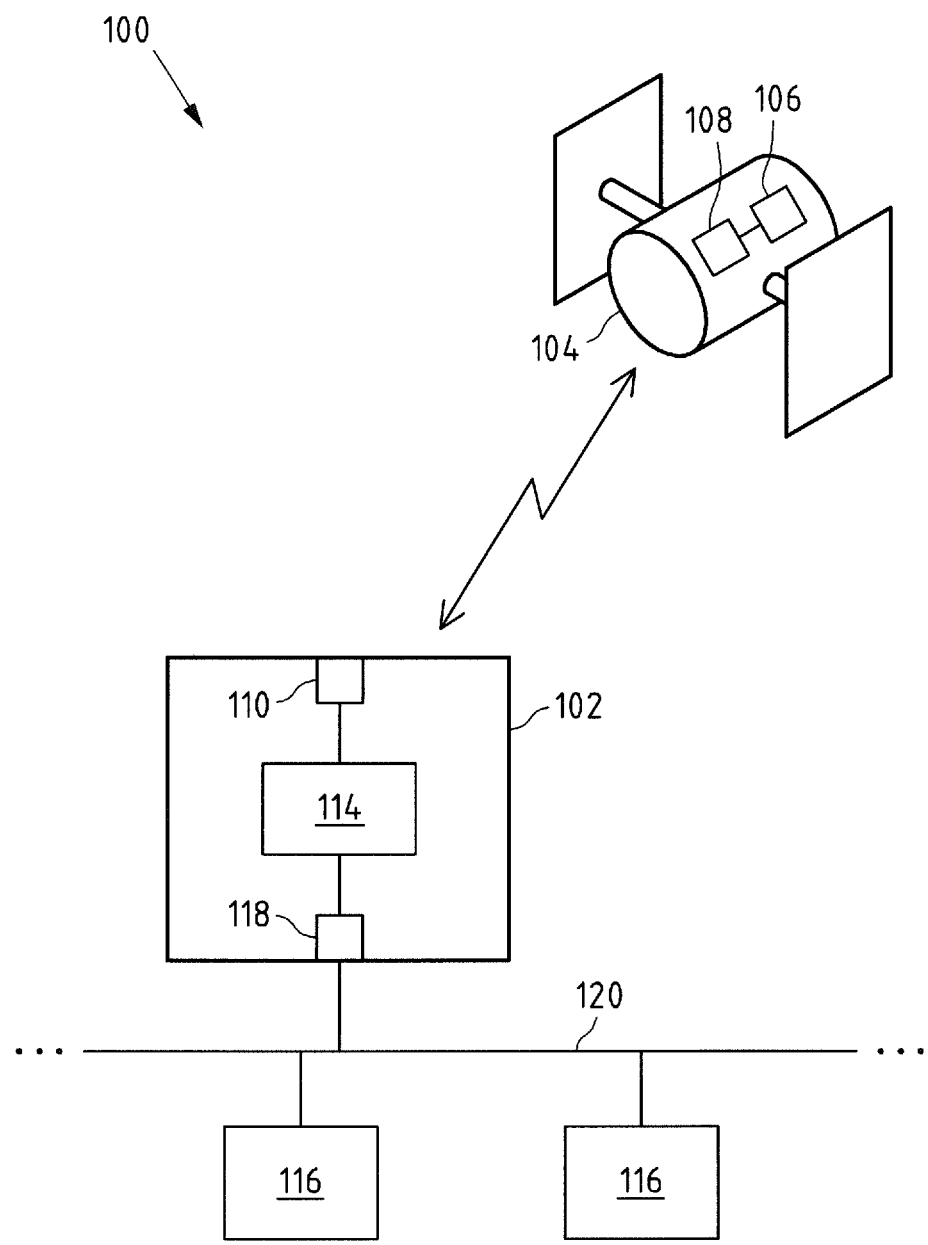
FIG. 1 shows a schematic view of an observation system according to prior art.

Like reference numerals in different figures indicate like elements.

Figure 2:
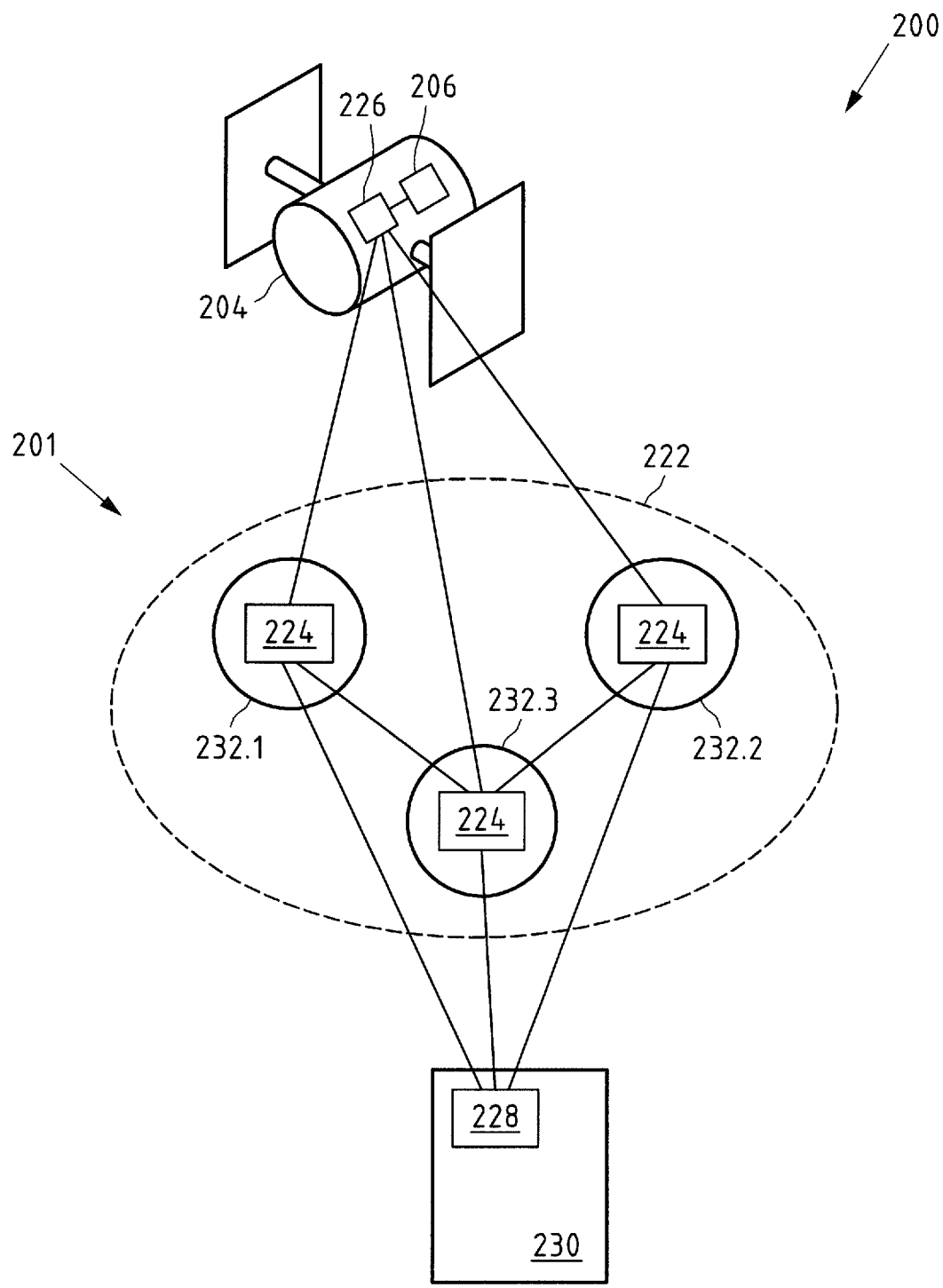
FIG. 2 shows a schematic view of a first embodiment of an observation system according to the present invention.

FIG. 2 shows a schematic view of an embodiment of an observation system 200 according to the present invention, wherein the observation system 200 comprises an access control arrangement 201. The depicted observation system 200 comprises an observation device 204 in form of an observation satellite 204. For instance, the observation device 204 may be a weather observation device 204 configured to observe the weather. In order to observe the weather by e.g. monitoring one or more meteorological parameter(s) the observation device 204 may comprise an observation unit 206 with one or more sensor(s) and/or one or more instrument(s). For instance, visual sensors(s) and/or other sensor(s) for detecting electromagnetic waves can be implemented. It shall be understood that an observation system may comprise two or more (different) observation devices.

A substantial difference compared with prior art observation systems, such as observation system 100 according to FIG. 1, is that no central instance and/or third party organization is provided. In the present case, the observation system 200, in particular, the access control arrangement 201 comprises a peer-to-peer network 222 or a computer-computer network 222. The peer-to-peer network 222 comprises a plurality of nodes 232.1, 232.2, 232.3 and computers 232.1, 232.2, 232.3, respectively. A peer-to-peer network 222 is characterized in the present case in that each node 232.1, 232.2, 232.3 and/or participant 226, 228 is preferably connectable at least to every other node 232.1, 232.2, 232.3 and/or participant 226, 228. For instance, at least one physical standard network (wired and/or wireless) can be used for connection. For communicating via the at least one physical standard network suitable transceiver modules may be arranged in the respective entities/devices.

In addition, the computers 232.1, 232.2, 232.3 have equal rights, something which distinguishes them from a server-client structure.

The depicted nodes 232.1, 232.2, 232.3 (each) comprise a peer-to-peer application 224. As can be seen from FIG. 2, the same peer-to-peer application 224 is preferably implemented on each node 232.1, 232.2, 232.3. The peer-to-peer application 224 may preferably be a public register 224 that can, in particular, be inspected by all participants 232.1, 232.2, 232.3, 226, 228 (not only the nodes 232.1, 232.2, 232.3) of the peer-to-peer network 222. Each node 232.1, 232.2, 232.3 preferably has the (entire) public register 224. It may also be envisaged that only part of the register can be provided on a node (light node). In a particularly preferred embodiment, the peer-to-peer application 224 may be a block chain 224 which will be explained in more details hereinafter. It shall be understood that the peer-to-peer network may comprise further nodes. In addition, it shall be understood that also an observation device and/or an access entity can be formed as a node of the peer-to-peer network.

The peer-to-peer application 224 may be configured to manage and control the access to the at least one observation device 204. For instance, the peer-to-peer application may comprise an access controlling means. In particular, the access of an access entity, 230, such as a computing device 230, to the observation device 204 is controlled by the peer-to-peer application 224 and the peer-to-peer network 222. In order to obtain an access to the observation device 204, a first peer-to-peer module 226 assigned to the observation device 204 and a second peer-to-peer module 228 of the access entity 230 are provided. It shall be understood that there may be two or more access entities.

A peer-to-peer module 226, 228 is (generally) configured to communicate at least with the peer-to-peer network 222, i.e. the nodes 232.1, 232.2, 232.3 of the peer-to-peer network 222. In other words, the peer-to-peer module 226, 228 or the observation device 204 or access entity 230 corresponding or assigned to the respective first and second peer-to-peer modules 226, 228 is at least a participant of the peer-to-peer network 222. Preferably, all participants 232.1, 232.2, 232.3, 226, 228 (including all nodes) of the peer-to-peer network 222 are known to each participant 232.1, 232.2, 232.3, 226, 228 of the peer-to-peer network 222.

In the present case, the first and second peer-to-peer modules 226, 228 are not nodes of the peer-to-peer network 222 but only participants 226, 228. While the nodes 232.1, 232.2, 232.3 or computers 232.1, 232.2, 232.3 in the peerto-peer network 222 comprise at least a part of the peer-to-peer application 224, a participant of a peer-to-peer network 222, like the present peer-to-peer modules 226, 228, does not comprise the peer-to-peer application 224. Such a peer-to-peer module 226, 228 is configured to provide (only) access to the peer-to-peer application 224 e.g. via an API (application programming interface). Each peer-to-peer module 226, 228 (also a node or light node) may comprise a decentral application and at least an API. In the case, the peer-to-peer module is formed as a node of the peer-to-peer network the peer-to-peer module (also) comprises at least partly the peer-to-peer application 224. It shall be understood that a peer-to-peer module 226, 228 might be a node of the peer-to-peer network. It shall be understood that a peer-to-peer module 226, 228 may have access or may be connected to a gateway running a node of the peer-to-peer network.

The first peer-to-peer module 226 may comprise a communication connection to the observation unit 206. The observation unit 206 may be configured to measure one or more observation parameter(s) in accordance with at least one first instruction data set. The first instructions data set may comprise one or more instruction(s) for operating the observation unit 206. In particular, by means of the peer-to-peer application 224, the first instructions data set can be provided to the first peer-to-peer module 226. For instance, an access controlling means can provide a first instruction data set to the first peer-to-peer module 226. By way of example, such a data set can be stored in the public peer-to-peer application 224. The at least one observation device 204 can inspect and read out, respectively, the first instructions data set e.g. assigned to the observation device 204 using its peer-to-peer module 226. Alternatively or additionally, a first instructions data set message can be transmitted to the first peer-to-peer module 226 of the observation device 204. The access controlling means may be configured to cause storing and/or transmitting of the at least one first instructions data set. A first instructions data set may be locally stored by the observation device 204.

The providing of the first instructions data set is caused or initiated by the second peer-to-peer module 228 of the access entity 230. Preferably, after the conduction of an access authorization evaluation process by at least part of the nodes 232.1, 232.2, 232.3 of the peer-to-peer network 222 for checking whether the access entity 230 is actually entitled to access the observation device 204, the access entity 230 may provide an instruction information to the peer-to-peer application 224. It shall be understood that the access authorization evaluation process can also be performed upon a receipt of an instruction information from an access entity 230. Upon receipt of an instruction information (and after a positive authorization evaluation result), the peer-to-peer application 224 may be configured to provide the first instructions data set based on the received instruction information to the first peer-to-peer module 226. For instance, the instruction information can be (simply) forwarded to the first peer-to-peer module 226 or the instruction information can be converted to a first instructions data set which can then be forwarded to the first peer-to-peer module 226.

According to a preferred embodiment, the observation result(s) in form of one or more observation data set(s) can be provided from the first peer-to-peer module 226 to the second peer-to-peer module 228 in a similar way.

Figure 3:
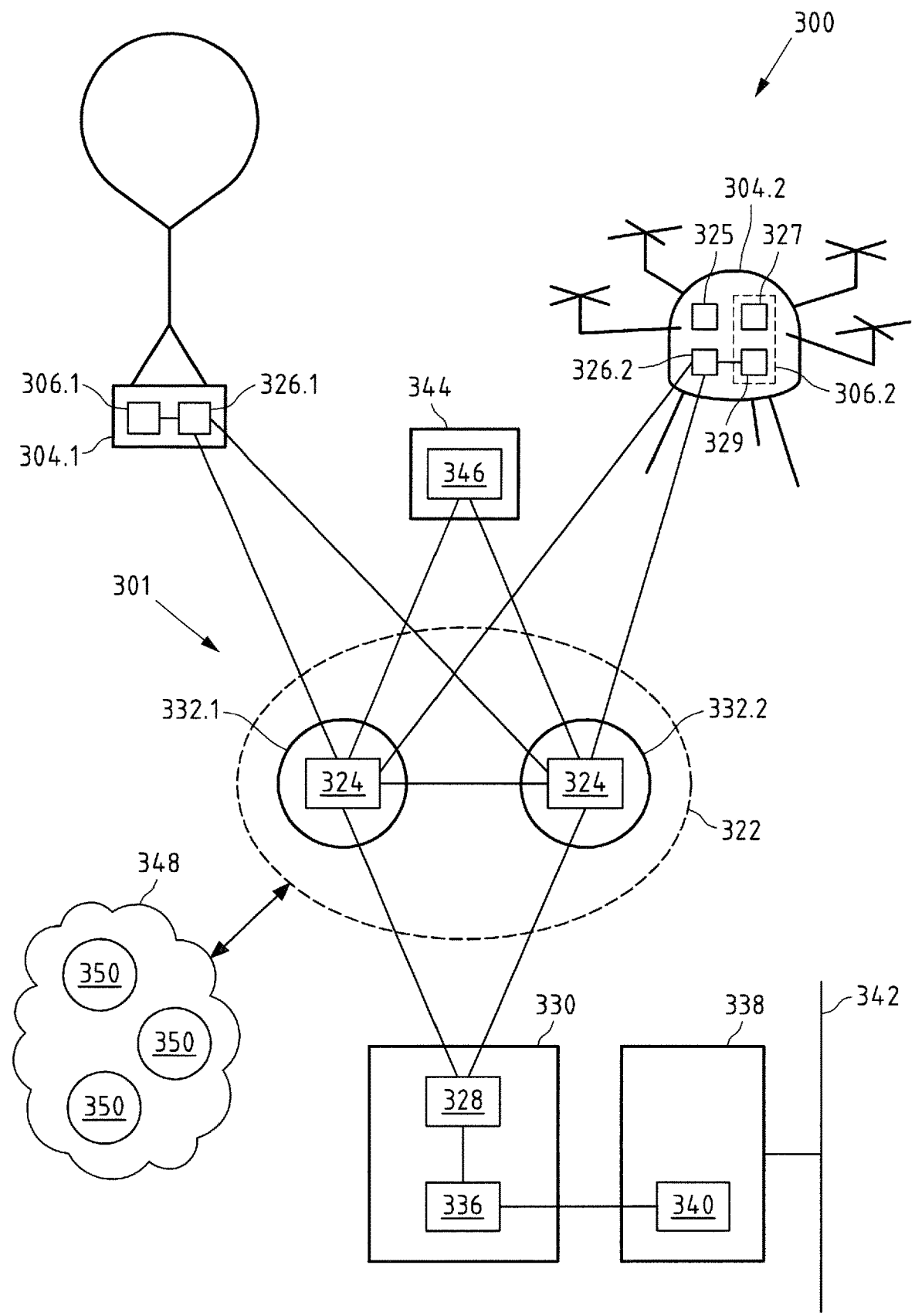
FIG. 3 shows a schematic view of a further embodiment of an observation system according to the present invention.

FIG. 3 shows a further embodiment of an observation system 300 according to the present invention. The present observation system 300 comprises an access control arrangement 301 and two observation devices 304.1, 304.2. It shall be understood that three or more (different) observation devices may be provided.

The first observation device 304.1 may be formed as a weather observation balloon 304.1 comprising a first peer-to-peer module 326.1 and an observation unit 306.1. The observation unit 306.1 can comprise one or more sensor(s)/instrument(s) configured to collect information/parameter values on atmospheric pressure, temperature, humidity and/or wind speed. For instance, the observation unit 306.1 can comprise a small, expendable measuring element called a radiosonde.

The second observation device 304.2 may be an aircraft 304.2 in form of a drone 304.2. The drone 304.2 may be an autonomously operated drone 304.2. The drone 304.2 comprises a first peer-to-peer module 326.2 and an observation unit 306.2. The depicted observation unit 306.2 may comprise two (separate) elements 327, 329. In particular, a drive controlling element 327 and an observation element 329 with one or more observation sensor(s)/instrument(s) may be provided.

More particularly, by means of the drive controlling element 327 and the observation element 329, one or more desired observation parameter(s) can be measured at one or more desired location(s). For instance, the first instructions data set can comprise drive or movement control instruction(s) (e.g. speed instruction data, height instruction data, geographic location data, etc.) and observation instruction(s) (e.g. instructions data about the parameter(s) to be measured).

The at least one first instructions data set may be locally stored in a computing unit or memory 325 of the drone 304.4. For instance, a secure memory 325 in form of a protected software container 325 can be provided. The observation unit 306.2 may be configured to access the local memory 325. The observation device 304.2 can then be operated in accordance with the stored first instructions data set. In a further embodiment a secure computing unit 325 in form of a trusted execution environment 325 can be provided. The observation unit 306.2 may be configured to interact with (analytical) algorithm(s) and data stored in the local computing unit 325. The observation device 304.2 can then be controlled by analytical algorithm(s) in accordance with the stored first instructions data set. Examples are special object recognition, face recognition, emergency recognition, number plate or vehicle ID recognition, security incident recognition or free parking space recognition. The instruction data set can be configured to send alert message(s) or trigger actions of actors connected with the observation system.

Analytical algorithm(s) can be connected or interact with a (central) off-chain computing system. In an embodiment analytical algorithm(s) may be configured to exchange analytics data among the devices of an observation system. Devices, analytical algorithms, control and instruction parameter sets may be stored and the peer-to-peer application.

An observation unit 306.1, 306.2 may be configured to create at least one observation data set based on at least one measured parameter related to the observation object, such as the weather. The created observation data set may comprise one or more measured parameter value(s) of one or more (different) parameter(s). In addition, the created observation data may comprise additional information, such as the measuring conditions of the measured parameter value(s). Exemplified measuring conditions are boundary measuring conditions, such as measuring location, measuring time, speed of the observation device 304.1, 304.2 during measuring, etc. The created at least one observation data set can be (directly) provided to the peer-to-peer application or temporarily stored in a local memory 325 e.g. in case a communication connection between the first peer-to-peer module 326.1, 326.2 and the peer-to-peer network 222 is currently not available.

It shall be understood that each observation unit may be configured to create at least one observation data set and to provide said observation data set to the peer-to-peer application. It shall be further understood that the observation unit may be configured to trigger actor(s) and/or to send message(s).

As previously described, the one or more observation data set(s) can be provided to the access entity 330 which initiated the observation process/action. Alternatively or additionally, the (raw) observation data set(s) can be previously evaluated by at least one evaluating means 346 of the observation system 300. The depicted observation system 300 comprises at least one off-chain computation entity 344 having at least one evaluating means 346. It shall be understood that there may be a plurality of evaluating means e.g. configured for one or more (different) tasks. An evaluating means can be formed by an algorithm, (decentral) machine learning and/or (decentral) cognitive analytics. Machine learning or cognitive analytics across two or more observation and/or access entities may be orchestrated via the peer-to-peer application.

Algorithms and data can be deployed via software container technology. In a preferred embodiment algorithms and data are deployed into trusted execution environments.

For instance, an access controlling means of the peer-to-peer application 324 may be configured to transmit one or more system observation data set(s) of one or more observation device(s) to at least one (off-chain) evaluating means 346. In addition, further data can be provided by data feed(s).

The evaluating means 346 may be configured to evaluate the one or more observation data set(s) and/or additional data sets of further sources (e.g. at least one further observation device and/or at least one data feed) and to provide an evaluation result e.g. to the access controlling means and/or to the peer-to-peer application 324. The evaluation result may be stored in the peer-to-peer application 324 and may be validated by at least a part of the peer-to-peer nodes 332.1, 332.2. For instance, the access controlling means (or another means of the peer-to-peer application 324) may provide the evaluation result to the respective access entity 330.

It shall be understood that one or more evaluating means may also be configured at least in part as a smart contract implemented on the peer-to-peer application 324. In addition, an off-chain computation entity may comprise one or more machine learning module(s) and/or one or more artificial intelligence module(s) in order to analyze e.g. meteorological parameters in order to provide e.g. a weather forecast as an evaluation result.

Furthermore, data can be stored in the peer-to-peer application 324 and/or in a database/storage 348 controlled by the peer-to-peer application 324. Preferably, the database 348 comprising a plurality of decentral storage units 350 may be formed as a decentral file system (such as IPFS) or a decentral object store (such as storj) or a decentral distributed database (such as BigchainDB) controlled by the peer-to-peer application 324.

As described hereinbefore, the at least one observation data set and/or evaluation result corresponding to at least one observation data set can be provided to the second peer-to-peer module 328 of the access entity 330. The access entity 330 may be configured to use the obtained data for controlling a further entity 338. For instance, the access entity 330 may comprise a first controlling module 336 for driving a second controlling module 340 of e.g. a power plant 338. The power plant 338 may be configured to supply electrical power to a mains 342. The power plant 338, in particular, the delivery of power may be controlled depending at least on measured meteorological parameter value(s) and/or a weather forecast(s). The reason may be that the electrical power to be delivered may depend on the power delivered from other power plants, such as wind turbines and/or photovoltaic devices. Since the power delivery of said devices depends directly on the weather condition in the vicinity of said devices, the access entity 330 may use one or more observation device(s) 304.1, 304.2 to obtain particular accurate weather forecast data for the respective area(s) in order to control one or more power plant(s) 338. It shall be understood that a central or decentral grid control system can provide further control data to control one or more power plants.

Figure 4:
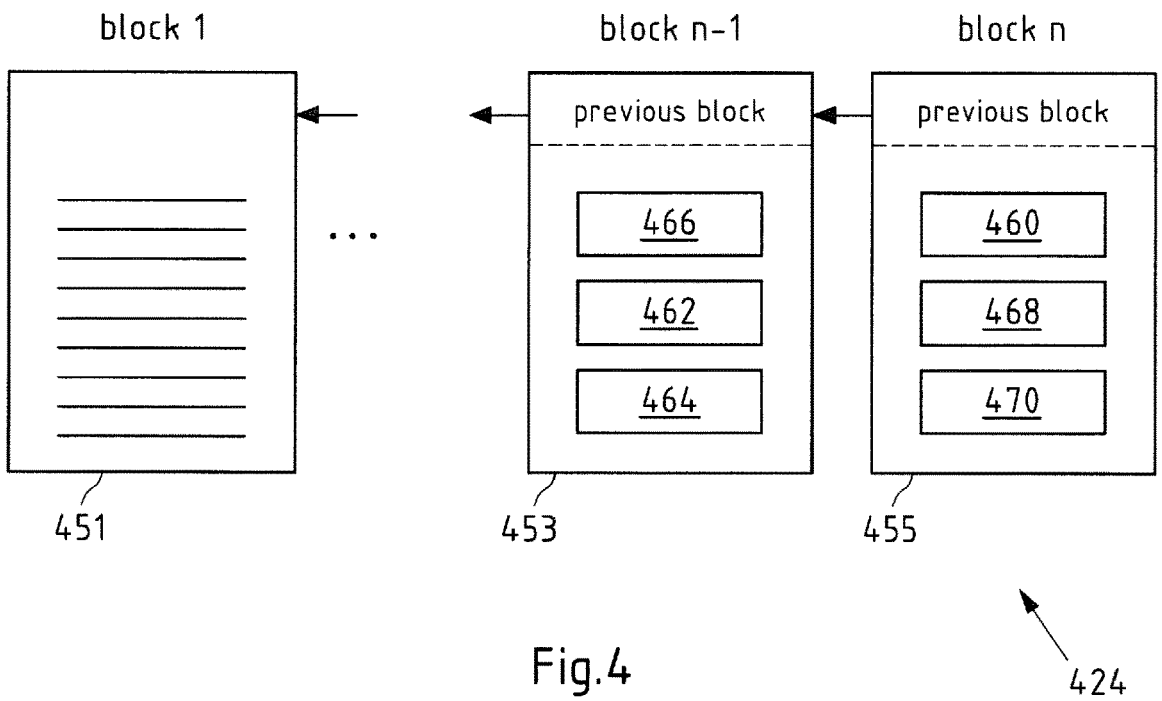
FIG. 4 shows a schematic view of an embodiment of a peer-to-peer application according to the present invention.

FIG. 4 shows a schematic view of an embodiment of a peer-to-peer application 424 according to the present invention.

The depicted peer-to-peer application 424 is a register readable, in particular, by the participants of the peer-to-peer network. Thereby, data set(s) e.g. in form of messages can be written and/or read into/from the register 424 by a peer-to-peer module of an observation device, an access entity and/or any other participants in the peer-to-peer network. In a preferred embodiment, the peer-to-peer application 424 may be a block chain 424.

Hereinafter, it is assumed in the following description of the present embodiment that the at least one peer-to-peer application 424 is a block chain 424. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 424 is formed by at least one block 451, 453, 455, preferably by a plurality of interconnected blocks 451, 453, 455. The first block 451 may also be called genesis block 451. As can be seen, a block 453, 455 (except for the first block 451) refers to each previous block 451, 453. A new block can be created by a computationally intensive process (for example, so called "mining" or through another appropriate process, such as voting) and will be particularly provided to all participants of the peer-to-peer network.

The present block chain 424 is particularly adapted to receive messages, such as messages comprising instruction information and/or instructions data set(s), observation data set(s), evaluation result(s), etc., from a peer-to-peer module of a previously described observation device, access entity, off-chain computing entity or from another peer-to-peer device/unit of another participant of the peer-to-peer network. Further, the block chain 424 is particularly adapted to save these messages in the block chain 424. Furthermore, the block chain 424 is configured to generate messages e.g. based on an observation process/action, an access authorization evaluation process, an evaluation result and/or caused by a peer-to-peer module and/or the execution of code of e.g. an access controlling means 466. In particular, the block chain 424 is at least configured to control and manage an observation system, such as shown in FIG. 2 or 3.

In particular, a (newly) received message can be saved and published in the current block 455 of the block chain 424. Due to the configuration of a block chain 424 as a public register 424, said data message of e.g. a peer-to-peer module can be read by preferably all participants of the peer-to-peer network. Alternatively or additionally, data of a message may be stored on a decentral file service or distributed block chain database controlled by the block chain 424.

As already described, in the present block chain 424 different types of messages and data sets, respectively, for example, within a smart contract (algorithm and/or storage at the block chain 424) can be processed and/or stored. In the present example, the block chain 424 comprises an access controlling means 466 in form of a smart contract 466. As previously described the access controlling means may be configured to manage a temporary access of an access entity to at least one observation device, and may e.g. conduct an access authorization evaluation process.

Furthermore, in the block chain 424 one or more observation access transaction agreement(s) 462 may be stored. An observation access transaction agreement 462 may be generated between two entities, such as an access entity which desires to at least temporarily access at least one observation device in order to obtain observation data and a provider entity which provides said at least one observation device. An example of a generation of such an observation access transaction agreement 462 will be described in the following:

An observation access transaction agreement 462 may comprise at least one of the following data:
Access duration condition: Condition(s) determining the start and/or end of an access of an access entity to at least one observation device, such as an access start condition and/or an access end condition
Identifier(s): One or more identifier(s) of the involved entities, such as an identifier of the access entity, an identifier of the at least one observation device, identifier of the provider entity, etc.
Observation access criterion: Criterion that must be fulfilled by an access entity for accessing the observation device
Access detail(s): Detail(s) about the released function(s) of the observation unit The observation access criterion may be e.g. an amount of cryptocurrency e.g. per time unit or per data amount unit which has to be transferred prior to, during and/or after the accessing of the at least one observation device. Preferably, at least a part of the agreed amount of cryptocurrency can be locked by the peer-to-peer application 424 prior to the access action. In an embodiment the observation access criterion may be a payment channel for streaming small amounts of crypto tokens per each time and/or data unit. It shall be understood that other transaction criteria and further information can be included in an observation access transaction agreement. More information/criteria can be, for example, a time stamp, an ID of the transaction and the like.

In order to generate an observation access transaction agreement 462, a second peer-to-peer module of an access entity and a peer-to-peer module of an provider entity can exchange observation request and response (acceptance) messages via the peer-to-peer application 424. A request message may comprise indications about the above data (identifications, transaction criteria).

For instance, a provider of an observation device with one or more observation function(s) can send by a peer-to-peer module a (offer) message 464 to the peer-to-peer application 424 comprising data, such as an identifier assigned to the provider, available function(s) of the observation device, geographic coordinates of the potential area of application of the observation device, identifier of the observation device and/or at least one access transaction criterion.

Another message 460 may be an acceptance message 460 and request message 460, respectively, of an access entity. An acceptance message 460 may comprise identical or at least similar data details as compared with a (offer) message 464. Additionally, the acceptance message 460 can comprise a reference indication to a previous message, such as the ID of the message 464. The acceptance message 460 can be provided by the second peer-to-peer module of an access entity.

If, for example, the acceptance message 460 comprises a higher or other transaction criterion and/or another desired access duration condition, the acceptance/request message 460 can be called a counter-offer message. This can be accepted by the peer-to-peer module of the provider entity through an acceptance message. Based on this a peer-to-peer module of an access entity and/or provider entity may cause the generation of an observation access transaction agreement 462 about an temporary access to an observation device.

In particular, there can be multiple offer messages and/or request/accepting messages and/or messages comprising a requested observation device for different transaction criterions. Each entity can give guidelines, according to which at least one observation access transaction agreement 462 or other agreements can be generated. In a preferably automated, such as iterative process, each request/offer message can be associated to an optimally corresponding acceptance message. The block chain 424 may be configured to generate, based on the messages of a peer-to-peer module, an observation access transaction agreement 462.

Further, the access controlling means 466 may be configured to control the access to the at least one observation device (and/or user) based on the one or more observation access transaction agreement(s) 462. The access controlling means 466 may be executed by at least part of the nodes of the peer-to-peer network for conducting an access authorization evaluation process. For instance, based on a stored access duration condition and stored identifier of an observation access transaction agreement 462, the peer-to-peer application 424, in particular, the access controlling means 466 may allow an access of said access entity to the observation device. For instance, the identifier of an access entity (e.g. a user) sending an instruction information can be compared with the stored identifier. Only in the case the received identifier corresponds to the stored identifier, the instruction information can be further processed e.g. by transmitting a first instruction data set based on the instruction information to the observation device specified in the observation access transaction agreement 462. In particular, the access to the observation device can be released in accordance with an access start condition and/or can be locked in accordance with an access end condition.

Moreover, a block chain 424 may comprise a registering means 470 configured to register a (new) observation device and/or access entity in the block chain 424 as a smart asset and/or an evaluating means and/or storage means.

As can be further seen, the present application comprises a permission means 468. Preferably, one or more permissions, one or more identifiers and one or more accounts may be stored in the block chain 424. For instance, all identifiers of each registered entities may be stored preferably together with account and/or permission data.

Figure 5:
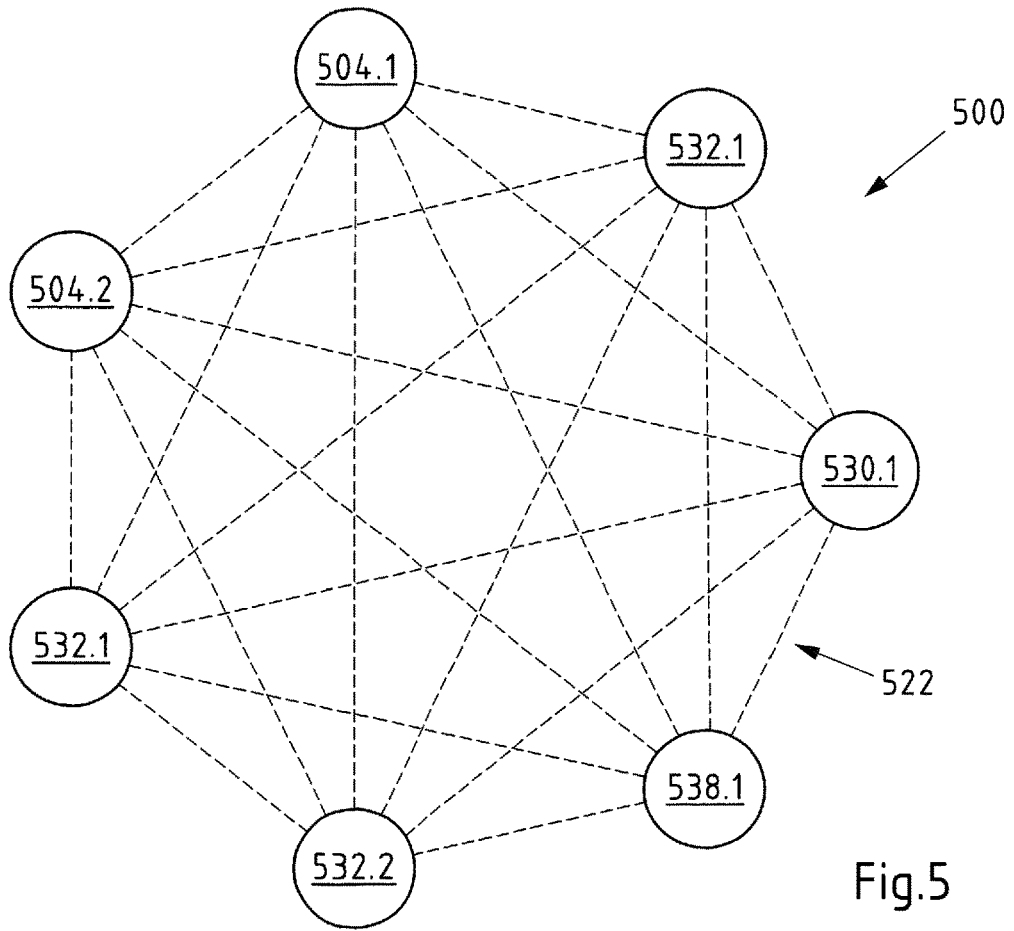
FIG. 5 shows a schematic view of a further embodiment of an observation system according to the present invention.

FIG. 5 shows a schematic view of another embodiment of an observation system 500 of the invention. In the present embodiment only nodes and participants 504.1, 504.2, 532.1, 530.1, 532.1, 532.2, 538.1 of the peer-to-peer network 522 are shown. In the present example, it is assumed that all nodes 504.1, 504.2, 532.1, 530.1, 532.1, 532.2, 538.1 comprise the peer-to-peer application (not shown).

The nodes 504.1, 504.2 may correspond to observation devices and e.g. be formed by the respective first peer-to-peer modules of observation devices. The node 530.1 may be an access entity realized by a second peer-to-peer module, and node 538.1 may be a further entity 538.1, such as a power plant. Nodes 532.1 and 532.2 may be other nodes which are not an observation device and/or access entity. It shall be understood that nodes can be full, remote or light nodes.

As can be seen, two different types of peers or node computers 504.1, 530.1, 532.1, 538.1 and 504.2, 532.2 are presently illustrated. All peers 504.1, 530.1, 532.1, 538.1, 504.2, 532.2 are comprised by the peer-to-peer network 524. In the present embodiment, however, only a part of the peers 504.1, 530.1, 532.1, 538.1, 504.2, 532.2 in the present case, the peers (nodes) 504.1, 530.1, 532.1, 538.1, check the validity of e.g. an access controlling process, an evaluation process, an observation process and/or further data stored in the peer-to-peer application messages, such as agreements, instructions data set messages, and the like.

Further nodes can be formed to establish a control room for an observation system, a terminal for configuring the system, emergency information system, object/traffic condition control system or signal generating devices (all not explicitly shown in FIG. 5).

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 504.1, 530.1, 532.1, 538.1, especially particularly powerful peers 504.1, 530.1, 532.1, 538.1, perform the validation and/or access controlling algorithms.

Validation, analytics and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 504.1, 530.1, 532.1, 538.1 comes to a positive result. It shall be understood that only a single, especially particularly powerful peer can perform the validation, analytics and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment the peer-to-peer application can be formed using multiple block chains. These block chains are connected via frameworks such as sidechains or smart contracts or interlegder.

Figure 6:
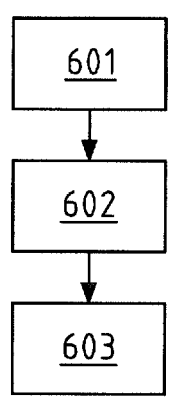
FIG. 6 shows a diagram of an embodiment of a method according to the present invention.

FIG. 6 shows a diagram of an embodiment of a method according to the present invention. The depicted method for operating an observation system or network, respectively, comprises optional steps. Further, it is noted that the order of the steps can be changed and/or steps can be conducted in parallel. In particular, a previously described system, such as the observation system of FIG. 2 or 3, can be operated with the subsequently described method.

In step 601, an access entity may cause the generation of an observation access transaction agreement. In particular, the access entity may desire to temporarily access and operate one or more observation devices. In order to cause the generation of an observation access transaction agreement, the access entity may respond to an offer message of a provider entity of the desired observation device by transmitting a request message with desired details about the access action.

As described hereinbefore, prior to actually generating an observation access transaction agreement an iterative process comprising the exchange of a plurality of messages may be performed. After all details of an observation access transaction agreement, such as desired observation device (ID of observation device), access duration condition (e.g. a start and end time), released one or more observation function(s) (e.g. one or more sensor(s)/instrument(s) and/or a drive control element of an observation unit), access transaction criterion (e.g. amount of cryptocurrency for the agreed access duration), etc. are clear, the observation access transaction agreement may be generated.

Preferably, prior to generating an observation access transaction agreement it is checked whether the involved entities are registered in the peer-to-peer application and in particular, whether a registered entity has the permission for generating an observation access transaction agreement. Thereby, a registering process may be conducted prior to generating an observation access transaction agreement.

In a next step 602, an access action can be performed. For instance, the access entity may access the observation device in accordance with a previously generated observation access transaction agreement in order to operate the observation device in a desired manner.

In a further step 603 an access transaction criterion transaction can be performed. E.g. after the access action, an agreed amount of cryptocurrency can be transferred from an account of the access entity to an account of the provider entity. It shall be understood that when an observation access transaction agreement is initiated the access entity may put a defined amount of cryptocurrency into a deposit to ensure security of the financial transaction. In a further embodiment, the usage of an observation device can be paid for with Micropayment Channels. The observation access transaction agreement may define minimum usage units (e.g. usage per second). Micropayments can be streamed to the provider entity and/or its owner per each minimum usage unit. In case micropayment transactions stop, operations of the observation device can be stopped accordingly (considering health and/or safety requirements for when stopping the observation device).

Figure 7:
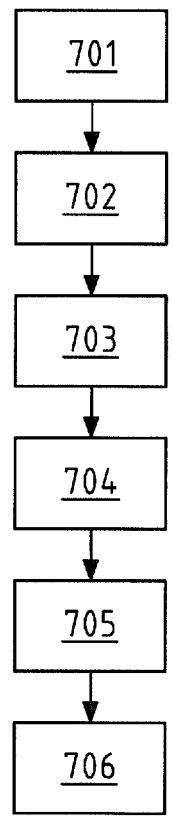
FIG. 7 shows a diagram of a further embodiment of a method according to the present invention.

FIG. 7 shows a further diagram of an embodiment of a method according to the present invention. In particular, details about an access action are shown.

In a first step 701, the access entity may cause the transmission of at least one specific first instructions data set to the observation device e.g. by transmitting instructions information to the peer-to-peer application, as previously described. The transmission of a specific first instructions data aims to obtain a desired observation data set from the observation device.

In a next step 702, the access of the access entity to the observation device is controlled by at least a part of the nodes of the peer-to-peer network. For instance, an instruction information sent by a second peer-to-peer module can be associated with an identifier (and/or signature) of the access entity and second peer-to-peer module, respectively. At least part of the nodes may validate the identifier (and/or signature) prior to processing said instruction information. Besides a comparison of the received identifier (and/or signature) with identifiers (and/or signatures) stored in one or more observation access transaction agreement(s), it can also be checked whether further access conditions, such as an access transaction criterion, an access duration condition and the like are fulfilled. In other words, in step 702 one or more access authorization evaluation process(es) can be conducted.

Then, in step 703 the observation device, in particular, the observation unit can be operated in accordance with the first instructions data set which is based on instructions information of the access entity.

During the operation of the observation device one or more observation data set(s) can be generated and provided to the peer-to-peer application (step 704). For instance, respective messages can be sent by the first peer-to-peer module to the peer-to-peer application.

In step 705, the peer-to-peer application provides the at least one observation data set to the respective access entity. For instance, at least one message can be sent to the second peer-to-peer module and/or the respective data can be read out by the second peer-to-peer module of the access entity. In the case, the at least one observation data set is evaluated by at least one evaluating means, it may be possible that the at least one observation data set and/or the at least one evaluation result is provided to the second peer-to-peer module In step 706, the access entity can further process and/or use the received at least one observation data set and/or the at least one evaluation result. For instance, the access entity can use received data to control a power plant, a traffic flow or the like.

Figure 8:
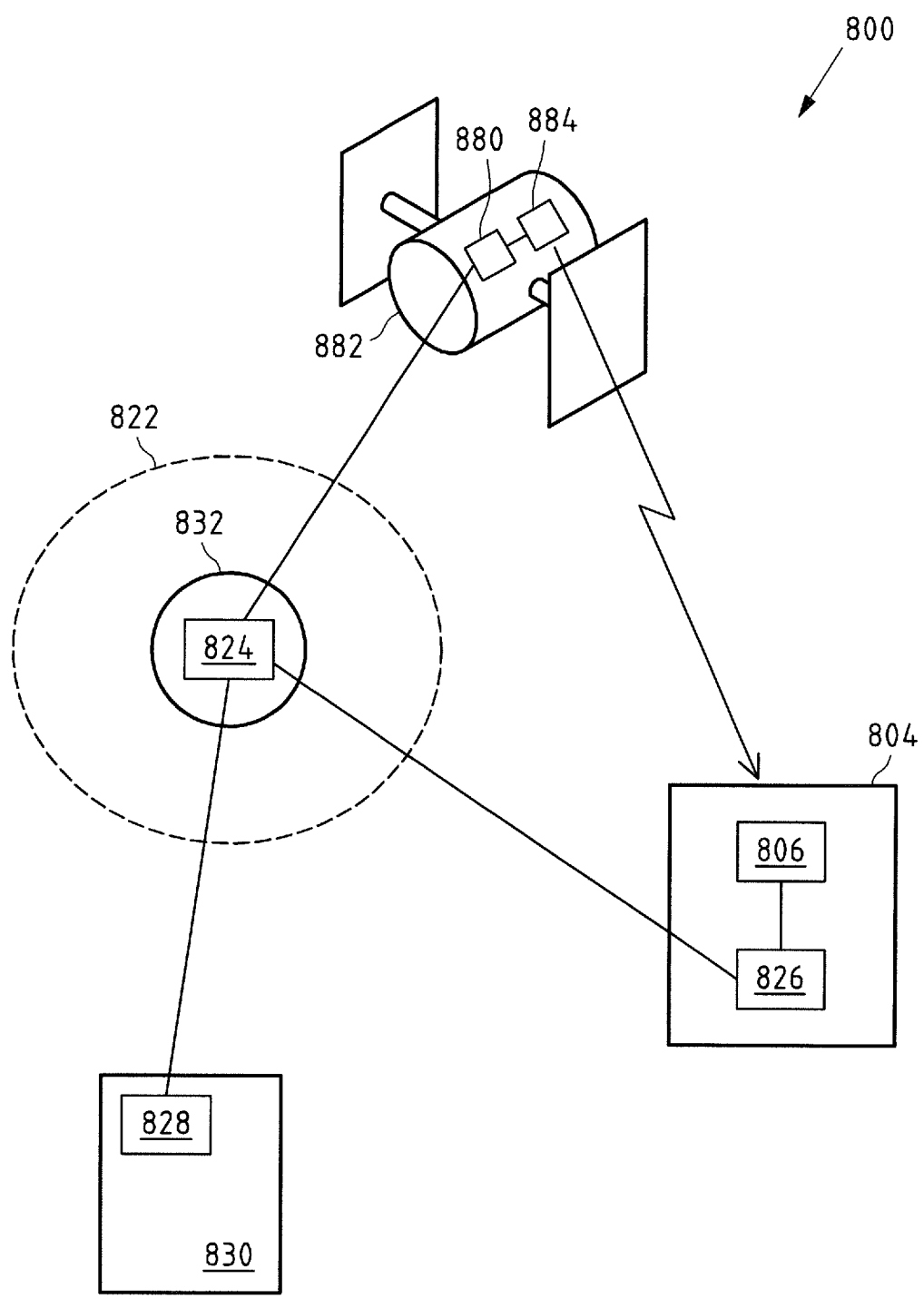
FIG. 8 shows a schematic view of a further embodiment of an observation system according to the present invention.

FIG. 8 shows a further embodiment of an observation system 800 according to the present invention. For avoiding repetitions, only the difference between the observation system 800 and the previously described systems are described. Otherwise, it is referred to the above explanations.

The depicted observation system 800 comprises a (previously described) peer-to-peer network 822, a generation device 882, an observation device 804 and an (previously described) access entity 830.

The generation device 882 comprises a peer-to-peer module 880 and a signal unit 884. In the present case, the generation device 882 may be a GPS satellite 882 configured to send positioning signals by means of the signal unit 884 (e.g. suitable sending means can be provided). In particular, each sent signal can be provided with a key, such as a private key, generated by the peer-to-peer module 880.

The observation device 804 may comprise an observation unit 806 (e.g. comprising a GPS receiver) configured to receive the signal(s). Prior to further processing the received signal, the observation device 804 may check the key of the signal by means of the peer-to-peer module 826 and the peer-to-peer application 824. For instance, the public key corresponding to the private key can be stored in the peer-to-peer application 824 and can be accessible by the peer-to-peer module 826 for checking the received key.

Furthermore, the access entity 830 may be configured to access the generation device 882 in order to trigger the sending of a signal to the observation device 804 e.g. by transmitting signal instruction data set(s) similar to the first instructions data set(s). It shall be understood that the generation device 882 may also continuously send the signal.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An observation system, comprising:
at least one observation device comprising at least one observation unit configured to observe at least one observation object in accordance with at least one first instruction data set, and at least one access control arrangement configured to control access to the observation device by at least one access entity,
wherein the access control arrangement comprises:
at least one first peer-to-peer module assigned to the observation device and configured to forward at least one first instruction data set to the observation unit,
at least one peer-to-peer application of at least one peer-to-peer network,
wherein the peer-to-peer application is configured to control the access to the observation device by allowing the access entity to cause the precision of at least one first instruction data set to the first peer-to-peer module,
where the peer-to-peer application is configured to generate at least one observation access transaction agreement about an access action to the observation device by the access entity;
wherein the peer-to-peer application is configured to store the generated observation access transaction agreement;
wherein at least a part of the nodes of the peer-to-peer network is configured to control access to the observation device by conducting at least one access authorization evaluation process, and
wherein the peer-to-peer application is configured to at least one of lock or release an access to the observation device depending on at least one access duration condition of the stored observation access transaction agreement.

2. The observation system according to claim 1, wherein the generated observation access transaction agreement comprises at least one of:
observation access criterion,
access duration condition, in particular, at least one of an access start condition or an access end condition,
access identifier assigned to the access entity,
at least one released function of the observation unit,
observation unit data evaluation algorithm(s),
at least one of observation unit data analytics parameter(s) or algorithm(s),
identifier assigned to an observation unit actor,
at least one of control parameter(s) or rule(s) for the observation unit actor,
access data for a (decentral) data storage, and
identifier assigned to the observation device to be accessed.

3. The observation system according to claim 1, wherein at least a part of the nodes of the peer-to-peer network is configured to conduct the access authorization evaluation process by evaluating at least one access identifier of an accessing entity and the at least one access identifier of the at least one stored observation access transaction agreement.

4. The observation system according to claim 1, wherein the access entity is configured to control at least one further entity depending on a provided observation data set.

5. The observation system according to claim 1, wherein the observation device and the access entity are arranged at a distance to each other.

6. The observation system according to claim 1, wherein the peer-to-peer application comprises at least one registration means configured to receive a registering message of at least one of a first peer-to-peer module assigned to the observation device or a second peer-to-peer module assigned to the access entity,
wherein the registration means is configured to register at least one of the observation device by storing a unique peer-to-peer identifier of the observation device or the access entity by storing a unique peer-to-peer identifier of the access entity.

7. The observation system according to claim 2, wherein the peer-to-peer application is configured to cause the generation of an observation access criterion transaction based on at least one observation access criterion of the stored observation access transaction agreement.

8. The observation system according to claim 1, wherein the observation system comprises at least one generation device with at least one signal unit configured to send at least one signal receivable by at least one observation device,
wherein the generation device is configured to provide the sent signal with at least one key.

9. The observation system according to claim 1, wherein the at least one peer-to-peer application is a decentralized register or a shared database,
wherein the peer-to-peer application is configured to store data with given certain proofs or signatures.

10. The observation system according to claim 1, wherein the at least one peer-to-peer application is a block chain or decentral ledger comprising at least two blocks coupled to each other.

11. The observation system according to claim 1, wherein at least a part of the nodes of the peer-to-peer network is/are configured to validate at least one message that is at least one of received or generated by the peer-to-peer application.

12. A method for operating an observation system, wherein the observation system comprises at least one observation device comprising at least one observation unit configured to observe at least one observation object in accordance with at least one first instruction data set, and at least one access control arrangement configured to control access to the observation device by at least one access entity, wherein the access control arrangement comprises at least one first peer-to-peer module assigned to the observation device and configured to forward at least one first instruction data set to the observation unit, at least one peer-to-peer application of at least one peer-to-peer network, the method comprising:
controlling the access by allowing the access entity to cause the provision of at least one first instruction data set to the first peer-to-peer module,
wherein the peer-to-peer application generates at least one observation access transaction agreement about an access action to the observation device by the access entity;
wherein the peer-to-peer application stores the generated observation access transaction agreement,
wherein at least a part of the nodes of the peer-to-peer network is configured to control access to the observation device by conducting at least one access authorization evaluation process, and
wherein the peer-to-peer application is configured to at least one of lock or release an access to the observation device depending on at least one access duration condition of the stored observation access transaction agreement.

13. A peer-to-peer application of a peer-to-peer network, comprising:
access controlling means configured to control an access to at least one observation device by at least one access entity,
wherein the access controlling means is configured to control the access by allowing the access entity to cause the provision of at least one first instruction data set to the first peer-to-peer module, wherein the peer-to-peer application is configured to generate at least one observation access transaction agreement about an access action to the observation device by the access entity;

wherein the peer-to-peer application is configured to store the generated observation access transaction agreement;

wherein at least a part of the nodes of the peer-to-peer network is configured to control access to the observation device by conducting at least one access authorization evaluation process; and wherein the peer-to-peer application is configured to at least one of lock or release an access to the observation device depending on at least one access duration condition of the stored observation access transaction agreement.

* * * * *